Figure 1:
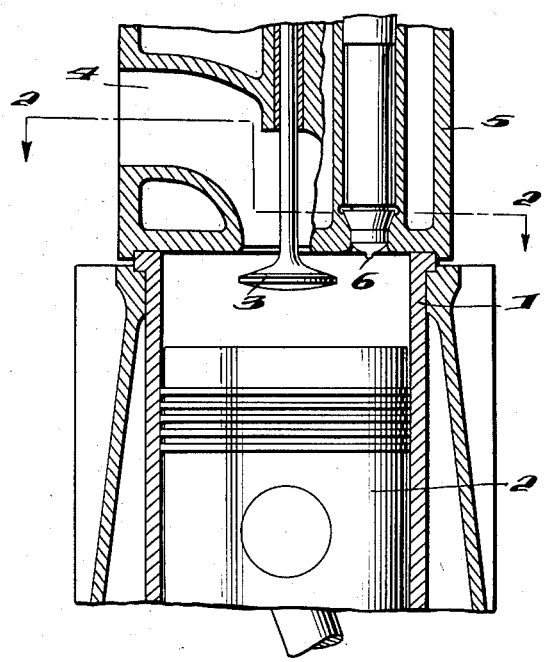

Oct. 20, 1959  O. HERWIG  2,909,416
SYNTHESIS GAS PRODUCTION
Filed July 2, 1956

INVENTOR
OTTO HERWIG,
BY
ATTORNEYS

United States Patent Office 2,909,416
Patented Oct. 20, 1959

2,909,416

SYNTHESIS GAS PRODUCTION

Otto Herwig, Nurnberg, Germany, assignor to Maschinenfabrik Augsburg-Nurnberg, A.G., Nurnberg, Germany Application July 2, 1956, Serial No. 595,508

Claims priority, application Germany July 12, 1955

1 Claim. (Cl. 48—196)

This invention relates to synthesis gas production. In particular, the invention is directed to the production of synthesis gas by means of an exothermic, incomplete combustion of hydrocarbon with oxygen in an internal combustion engine, together with the production of mechanical energy from said engine.

An object of the invention is to obtain a sure and faultless ignition of the gases in the engine and to eliminate misfirings in the engine, despite the formation of residues such as soot, resulting from the production of synthesis gas in the engine.

In the production of synthesis gas in internal combustion engines, ordinarily a relatively high intake of oxygen is necessary in order to maintain a smoothly running engine, as otherwise soot-like residues are formed in the combustion chamber and are deposited on the spark plugs to foul the same, cause misfirings, and eventually stalling the engine. The use of large quantities of oxygen is undesirable as the process itself is inherently highly economically burdened. Furthermore, the use of large quantities of oxygen with methane tends to cause the engine to knock and run roughly. Consequently, ordinarily efforts are made to keep the compression ratio low in the engine, and to couple the engine to a light load, which results in a low efficiency in the production of synthesis gas and a low power output from the engine.

From the chemical point of view, a high oxygen intake into the engine is not desirable, because the production of hydrogen and carbon monoxide is thus lessened as a greater proportion of the methane is completely burned to water vapor and carbonic acid.

These disadvantages are eliminated, according to the basic feature of this invention, by substituting a self-igniting fuel or agent for the spark plug usually used for igniting the gas in the combustion chamber.

The igniting fuel or agent is injected under pressure into the highly compressed gas and oxygen mixture in the combustion chamber, which is in a highly heated state. The igniting agent may be ignition oil, an oxygen carrier, or any other suitable igniting means. This type of ignition is not new per se, but has been used in the so-called ignition jet engines.

Heretofore the ignition jet process was not believed to be practical in the production of synthesis gas in internal combustion engines, because self-ignition of the injected fuel requires a compression ratio near that of diesel engines, such ratio seeming to be impossible in view of the knocking tendencies in the mixture of hydrocarbon gas and oxygen to be partially burned in the combustion engine. However, this invention discloses the surprising feature that the ignition jet principle can be utilized in producing synthesis gas when, in a high compression ratio engine, the oxygen content of the hydrogen gas and oxygen mixture is kept sufficiently low. In this case, the injection jet ignition of the oxygen gas mixture produces a higher formation of residues, especially soot in the combustion chamber, but this does not interfere with the running of the engine, because the ignition is not susceptible to being fouled by the soot as occurs when using spark plug ignition. The compression self-ignition of this engine is substantially non-sensitive to the formation of residues. Therefore, this invention obtains, simultaneously, with an engine free of ignition failures, a considerable reduction in the oxygen content of the reacting gas-oxygen mixture and an increase of the engine compression ratio up to those ratios common to diesel engines, despite the considerably higher formation of residues in the combustion chamber. The net result is a considerable improvement in the economic efficiency of the synthesis gas process because:

(a) The oxygen consumption is greatly lessened;

(b) The efficiency of the combustion cycle in the engine is improved by reason of the increased compression;

(c) The power output of the engine is increased; and (d) The yield of synthesis gas from a given quantity of hydrocarbon gas is increased.

As the quantity of igniting fuel or agent changes with the type of hydrocarbon gas being used, the fuel injecting means for the engine can be provided with means for adjusting the quantity of injected fuel during each working stroke of the engine.

The quantity of igniting fuel also depends on the load coupled to the engine and other operating factors. Therefore, the injecting means can also be provided with means for regulating the quantity of injected igniting fuel on each engine cycle as a function of the engine load or other operating factors.

A further feature of the invention lies in that other reaction elements can be added to the mixture of hydrocarbon gas and oxygen, such elements being anti-knocking substances such as iron carbonyl, carbonic acid, or water vapor to promote the chemical reaction.

Figure 2:
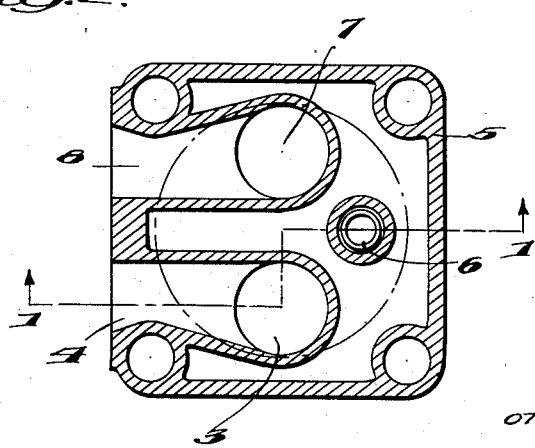

The process is more fully described with reference to the accompanying drawing, in which:

Figure 1 is a cross-sectional view through an engine cylinder taken on the line 1—1 of Figure 2; and Figure 2 is a horizontal cross-sectional view through the engine taken on the line 2—2 of Figure 1.

The process is described with the assumption that methane and oxygen are used as the intake gas into the engine for producing synthesis gas.

Basically, the invention is designed according to a diesel engine. The engine consists of a cylinder 1 containing piston 2, intake valve 3 communicating with intake duct 4 mounted in the cylinder head 5. The igniting fuel or agent is injected into the cylinder through nozzle 6 and the gases leave the cylinder through exhaust valve 7 leading to exhaust duct 8.

A mixture of methane and oxygen is drawn into the cylinder through intake valve 3. These two gases may be pre-mixed in an external mixing chamber, or they can be individually drawn into the cylinder through two special valves and mixed within the cylinder. Air can be used in place of pure oxygen. However, in either case, the volume of oxygen supplied to the cylinder must be less than 69.5 percent of the volume of the methane. The engine has a compression ratio of 11 to 1 or less, but in the order of diesel ratios.

Methane and oxygen are drawn into the cylinder upon the intake stroke of piston 2. On the compression stroke of the piston, and shortly before the piston reaches its upper dead center, the ignition fuel is injected into the cylinder through nozzle 6. This ignition fuel may consist of, for example, gas oil, petroleum, ether, or a mixture of these substances. The fuel is ignited by the heat of the highly compressed methane and oxygen mixture, and this self-ignition of fuel, in turn, fires the methane and oxygen mixture. The gas mixture, during the compression stroke, is only incompletely or partially burned because of the small quantity of oxygen present, so that synthesis gas is yielded as the exhaust gas. With a starting mixture of methane and oxygen, the synthesis gas exhausted is composed of about 60 percent hydrogen and 33 percent carbon monoxide, this gas being removed through duct 8 to a storage vessel. The synthesis gas produced is the starting material for the further production of many chemical products, such as methanol, nitrogenous fertilizers, and so forth.

The adjustment and regulation of the quantity of ignition fuel injected through nozzle 6 is effected in the same manner as the adjustment and regulation of the diesel oil injected into a diesel engine and consequently is not shown in detail in the drawings, as the construction is well known. The quantity of fuel injected is, in the average, from about 4 to 6 percent of the quantity of the methane-oxygen mixture when gas oil is used as the ignition fuel.

Having now described the means by which the objects of the invention are obtained, I claim:

A method of producing synthesis gas from a gas composed of methane and less than 69.5 percent oxygen comprising volumetrically introducing the gas composed of less than 0.695 part of oxygen to 1 part of methane into the combustion chamber of an internal combustion engine of the compression ignition type having a compression ratio at least that of a diesel engine, compressing the gas in said chamber, injecting a compression ignition fuel into the compressed gas in said chamber, and igniting said gas by the self-ignition of said fuel to incompletely burn said gas to form synthesis gas.

References Cited in the file of this patent

UNITED STATES PATENTS

| | | |
|---|---|---|
| 1,107,582 | Brownlee et al. | Aug. 18, 1914 |
| 2,470,747 | Shepherd | May 17, 1949 |
| 2,635,589 | Klinger | Apr. 21, 1953 |
| 2,763,537 | Barusch et al. | Sept. 18, 1956 |